H. D. PERKY, DEC'D.
L. SPARKS, ADMINISTRATOR.
VARIEGATED CORN FILAMENT.
APPLICATION FILED JAN. 19, 1906.
987,089.
Patented Mar. 14, 1911.
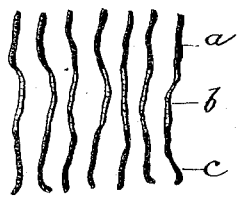

UNITED STATES PATENT OFFICE.

HENRY D. PERKY, OF GLENCOE, MARYLAND; LABAN SPARKS ADMINISTRATOR OF SAID HENRY D. PERKY, DECEASED.

VARIEGATED CORN FILAMENT.

987,089.  Specification of Letters Patent.  Patented Mar. 14, 1911.

Application filed January 19, 1906. Serial No. 296,869.

*To all whom it may concern:*

Be it known that I, HENRY D. PERKY, a citizen of the United States, and resident of Glencoe, in the county of Baltimore and State of Maryland, have made a certain new and useful Invention in Variegated Corn Filaments; and I declare the following to be a full, clear, and exact description of the same, such as will enable others skilled in the art to which it appertains to make and use the invention.

The drawing is designed to illustrate filaments of the article produced.

The object of the invention is a novel and attractive form of cereal food, and the invention consists in variegated filaments of cooked corn in which each filament is composed of alternating sections of different colored varieties, as hereinafter set forth.

In describing this invention, I will illustrate it in connection with maize or Indian corn, to which it is particularly adapted. Maize, as is well known, exists in several varieties having different characteristics, golden yellow corn being distinguished from white corn, not only because of the marked contrast in color, but also because of some variation in the constituent elements, white corn having, among other differences of minor importance, a greater proportion of protein.

In carrying out this invention, the grains are designed to be deprived of their hulls by means of any ordinary process. The grain is then ground, and, mixed with a little more water than material, is cooked in an air-tight or nearly air-tight and water-tight vessel, by immersing said vessel in boiling water or steam for about seven hours for corn, or until the cooking is completed, the time depending upon the kind of grain employed. The amount of water is designed to be limited to that which will be taken up by the material in the cooking, it being intended to cause it to solidify in the closed vessel in order to make it available in the succeeding steps of the process through its hardened or cake-like form. The cooked material is then cooled and in this condition is pressed through a perforated plate in order to produce sprays, or filaments of limited length, which are transferred to an oven or heater and dried.

Before pressing the material through the perforated plate, it is designed to provide the cooked material in two or more varieties, such as, for instance, yellow corn and white corn. A semi-solid cake of each of these varieties in the cooked form hereinafter described, is separated into slices having parallel surfaces, whereby they can be placed in solid contact, a slice of yellow material next to a slice of white material, so that the cake will have a compound structure, and will consist of both varieties of the grain. Now, if a mass formed of a considerable number of these alternate slices be pressed through a perforated plate, while the resultant sprays will be compounded, each of the two varieties, the mixture will be irregular because of the movement of the particles of the material of different slices faster or slower in the press, and the forms will not have a regular and uniform distribution of the coloring. But if two or three thin slices of about one-sixteenth of an inch in thickness be piled and pressed through a diameter about equal to such thickness, the resulting compound product will have the different varieties of the material separately and similarly located in each spray, so that the variations will be regular and uniform. Or, a thicker slice may be used in connection with a thin slice above and one below it, to form a tipped spray.

In this preparation it is found that by the pressure of the varieties of the material through the perforations, their particles, at the section joint or division between the slices, are brought together in a forcible and amalgamating manner, so that the resultant spray or form is a single and entire article of homogeneous or nearly homogeneous structure, and is at the same time composite having each variety separately located and forming a permanently joined section thereof as indicated at *a*, *b* and *c*, in the drawing.

Having described the invention, what I claim and desire to secure by Letters Patent is—

An article of food consisting of thin elongated and dried filaments of cooked corn in which each filament is composed of alternating sections of differently colored varieties of grain, said sections forming continuous homogeneous filaments of uniform consistency but of variegated appearance.

In testimony whereof I affix my signature, in presence of two witnesses.

HENRY D. PERKY.

Witnesses:
  WM. C. BREED,
  L. S. BURBANK.